United States Patent [19]

Kim

[11] Patent Number: 5,383,040

[45] Date of Patent: Jan. 17, 1995

[54] PLASMA ADDRESSED LIQUID CRYSTAL DISPLAY WITH CENTER SUBSTRATE DIVIDED INTO SEPARATE SECTIONS

[75] Inventor: Dae-Il Kim, Kyungki, Rep. of Korea

[73] Assignee: Samsung Electron Devices Co., Ltd., Kyungki, Rep. of Korea

[21] Appl. No.: 956,998

[22] Filed: Oct. 6, 1992

[30] Foreign Application Priority Data

Nov. 27, 1991 [KR] Rep. of Korea ............ 91-21453

[51] Int. Cl.⁶ .................. G02F 1/1343; G02F 1/137; G02F 1/1333
[52] U.S. Cl. ........................ 359/54; 359/82; 359/84; 359/87; 315/169.4; 313/493; 313/586
[58] Field of Search .............. 359/50, 55, 84, 87; 315/169.1, 169.2, 169.3, 169.4, 167, 168; 313/585, 586, 587, 584, 634; 345/493, 60

[56] References Cited

U.S. PATENT DOCUMENTS

| | | | |
|---|---|---|---|
| 3,614,509 | 10/1971 | Willson | 315/169.4 |
| 4,292,631 | 9/1981 | Gerard | 315/169.4 |
| 4,697,123 | 9/1987 | Shinoda et al. | 315/169.4 |
| 4,832,457 | 5/1989 | Saitoh et al. | 359/82 |
| 4,842,377 | 6/1989 | Nakanowatari | 359/81 |
| 4,896,149 | 1/1990 | Buzak et al. | 345/60 |
| 5,077,553 | 12/1991 | Buzak | 345/60 |
| 5,086,297 | 2/1992 | Miyake et al. | 345/60 |
| 5,107,182 | 4/1992 | Sano et al. | 313/587 |
| 5,136,207 | 8/1992 | Miyake et al. | 313/493 |
| 5,164,853 | 11/1992 | Shimazaki | 359/82 |
| 5,175,473 | 12/1992 | Kim | 315/169.4 |
| 5,207,607 | 5/1993 | Nagano et al. | 313/634 |
| 5,221,979 | 6/1993 | Kim | 359/55 |
| 5,239,227 | 8/1993 | Kikinis | 315/169.3 |
| 5,247,227 | 9/1993 | Park | 313/586 |

Primary Examiner—William L. Sikes
Assistant Examiner—Kenneth Paives
Attorney, Agent, or Firm—Leydig, Voit & Mayer

[57] ABSTRACT

A plasma addressed liquid crystal device (LCD) and its manufacturing method is disclosed wherein a second substrate is divided into segments which are connected at a joint. A third substrate is provided which includes a plurality of barriers formed thereon. The barriers are adhered to the second substrate by a gelled paste and the joints of the second substrate overlay the barriers. The joints and the barriers are fixed by the gelled paste so as to party absorb impacts from the second substrate.

10 Claims, 4 Drawing Sheets

PLASMA ADDRESSED LIQUID CRYSTAL DISPLAY WITH CENTER SUBSTRATE DIVIDED INTO SEPARATE SECTIONS

BACKGROUND OF THE INVENTION

The present invention relates to a plasma addressed liquid crystal display and a method for its manufacture, and more particularly to a plasma addressed liquid crystal display and a method for its manufacture having an improved plasma addressed unit.

Conventional displays include vacuum fluorescent displays using low-speed electron beams, plasma displays using gas discharge, electroluminescence (EL) displays using electroluminescence effects liquid crystal displays (LCD) using electro-optical effects as well as a traditional cathode ray tubes using high-speed electron beams. The various displays are selectively adapted according to their characteristics since they have different functions and structures. Their common purpose is to form an image from an electrical image signal or a data signal.

Recently, a matrix-type display compositely constructed with the plasma discharge device and electro-optical device, which is one type of LCD, was disclosed in U.S. Pat. No. 4,896,149 by Tektronix. Referring to FIG. 1, the display is constructed such that a liquid crystal shutter 10 in which a plurality of striped data electrodes 14 are arranged in parallel, overlaps with a plasma addressing unit 20 in which a plurality of unit scan lines 21 in the form of grooves are arranged at right angles to striped data electrodes 14 of liquid crystal shutter 10. A background generator (not shown), usually an EL device or cold-cathode fluorescent lamp, is provided at the rear of the plasma addressing unit.

With reference to FIG. 2, liquid crystal shutter 10 has first and second transparent substrates 12 and 13 between which liquid crystal is filled. Striped data electrodes 14 are formed on the inner side of first substrate 12 which is the front substrate. Having a thickness of about 50 μm, second substrate 13 of the two substrates plays a very important role in orienting the liquid crystal. Plasma addressing unit 20 has a plurality of scan lines 21 in the form of grooves on a third substrate 25 at right angles to the striped pixels. A pair of electrodes 22 and 23 are provided on either side of the bottom of each scan line 21. In this configuration, third substrate 25 is adhesively fixed to second substrate 13 of liquid crystal shutter 10 so that the grooves serving as scan lines 21 form closed discharge spaces in which discharge gas is filled.

DISCLOSURE OF THE INVENTION

To settle problems in manufacturing the conventional liquid crystal display, an improved crystal display has been developed which is the subject of U.S. patent application Ser. No. 07/864,791 assigned to the assignee of the instant application and schematically depicted in FIGS. 3 and 4.

Transparent first and third substrates 12' and 25' are positioned at a distance apart to protect a later-mentioned functional layer placed therebetween. A plurality of striped transparent data electrodes 14' are formed in parallel to each other on the first substrate 12'. A liquid crystal layer 16' and a second substrate 13' are subsequently provided in contact with the first substrate. The second substrate 13' has a thickness of 50 μm and a predetermined dielectric constant. A plurality of barriers 22' having a predetermined height and a striped second electrode 23' put in the middle of the barrier 22' are provided on the opposite side of liquid crystal layer 16', interposing second substrate 13'. First electrodes 21' are provided parallel with the second electrodes between the barriers and on the inner surface of third substrate 25'. In FIG. 3, second electrodes 23' are put between the bodies of barriers 22'. In FIG. 4, second electrodes 23' are placed on the top of barriers 22'.

In the above structure, barriers 22' and first and second electrodes 21' and 23' are perpendicular to the data electrodes formed on the first substrate. First electrodes 21' and the flanks of second electrodes 23' are exposed to a discharge space bounded by adjacent barriers 22' and second and third substrates 13' and 25'. The second electrodes 23' can be formed at the top or in the middle of the barrier 22' and positioned adjacent to either side of the first electrodes 21'.

In the above liquid crystal display, the second substrate of about 50 μm plays a very important role in orienting the liquid crystal. However, the material of the second electrode is expensive. Since its cost increases by geometric progression as the size of the material becomes larger, the expense of the second substrate becomes great, particularly in a large-screen liquid crystal display, thus raising the cost of the end product. This is because the substrate is very thin and its production cost is itself high, which hinders the commercialization of large-screen liquid crystal displays. Further, since the maximum size of the second substrate is currently 4" by 10", it is impossible to manufacture a liquid crystal display larger than this size by any technique known to date.

Accordingly, it is an object of the present invention to provide a plasma addressed liquid crystal display which has a reduced manufacturing cost and a large screen.

It is another object of the present invention to provide a plasma addressed liquid crystal display wherein the size of its screen is not restricted by the substrate size.

It is still another object of the present invention to provide a method for manufacturing the above plasma addressed liquid crystal displays.

To accomplish these and other objects, the plasma addressed liquid crystal display of the present invention comprises a first substrate on the inner side of which a plurality of striped data electrodes are provided, a second substrate of a predetermined thickness spaced from the first substrate to provide a liquid crystal space, a third substrate spaced from the second substrate, partition barriers of a predetermined height and width positioned between the second and third substrates for partitioning a plurality of parallel linear plasma discharge spaces and for providing to the second substrate a potential for activating the liquid crystal in cooperation with the data electrodes, and first and second electrodes for creating a linear discharge in each linear plasma discharge space, wherein the second substrate is composed of a plurality of divided substrate members which are connected to each other at selected joints, the joints being fixed on a top surface of the partition barriers.

In the above described plasma addressed liquid crystal display, it is desirable that the substrates' joints be fixed by a paste. Particularly, it is desirable that the past be baked and exist as a gel so as to have elasticity and so that the adherence and stabilization of the supporting structure of the second substrate are improved.

A method for manufacturing a plasma-addressed liquid crystal display is realized by selecting a first substrate, providing striped data electrodes on an inner surface of the first substrate, selecting a second substrate of a predetermined thickness which is composed of a plurality of divided members, selecting a third substrate and placing the third substrate a predetermined distance from the second substrate, forming partition barriers of a predetermined height on the third substrate for partitioning discharge lines in the third substrate, forming a plurality of electrodes for linear discharge on the discharge lines, fixing the third substrate to the barriers with paste and baking the third and second substrates, coupling the first substrate where the data electrodes are formed in advance to the second substrate, such that the first and second substrates are spaced apart, and filling liquid crystal between the first and second substrates and sealing them.

In the above method of the present invention, in one embodiment, during the step of forming the partition barriers of a predetermined height for partitioning discharge lines on the third substrate, the partition barriers are formed by forming channel-shaped grooves by etching the third substrate using photolithography.

In another embodiment, during forming of the partition barriers of a predetermined width and height, grooves or discharge lines are formed by the barriers by printing frit glass by a repeated screen printing method. Here, before the screen printing of the barriers, the first and second electrodes for linear discharge are formed between the partition barriers. In yet another embodiment of the method of forming said barriers, after forming the first electrodes placed between the barriers, during screen-printing of the barriers, the second electrodes may be stacked in the middle of or on the top of the barriers using conductive paste.

In the step of fixing the third and second substrates, after paste is formed by a predetermined thickness on the top of the barriers, the second substrate is put thereon and baked at a temperature where the paste exists as a gel.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
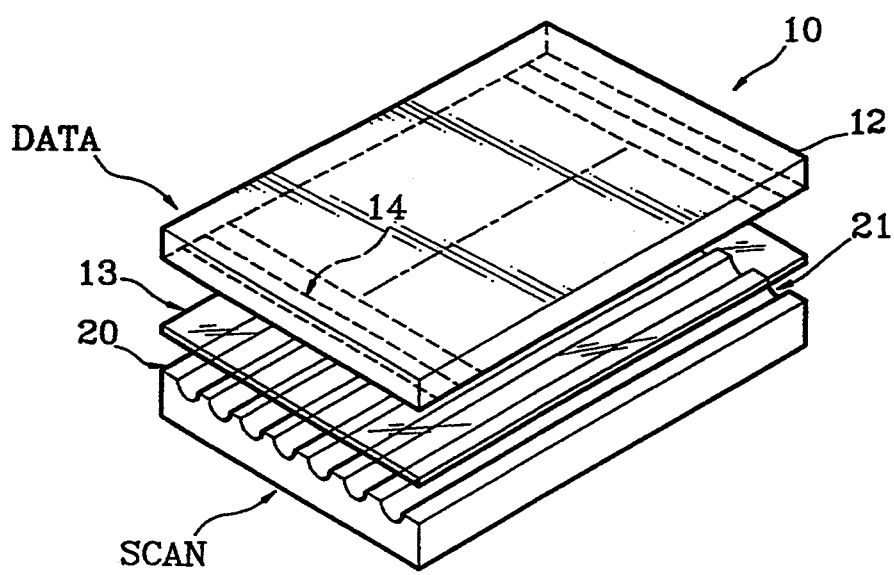
FIG. 1 is a schematic exploded perspective view of a conventional plasma addressed liquid crystal device.
Figure 2:
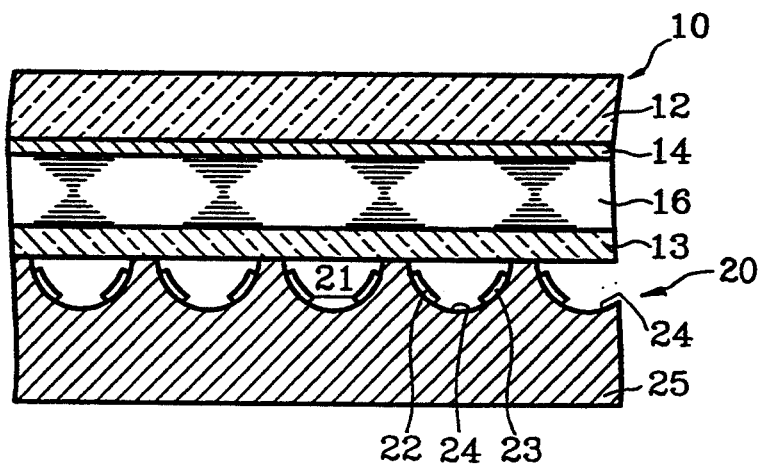
FIG. 2 is a partially enlarged sectional view of the display shown in FIG. 1.
Figure 3:
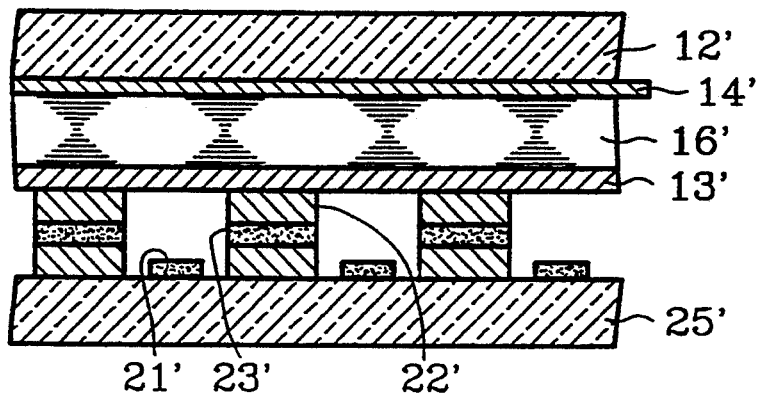
FIGS. 3 and 4 are schematic sectional views of a plasma addressed liquid crystal display previously proposed by this inventor.
Figure 4:
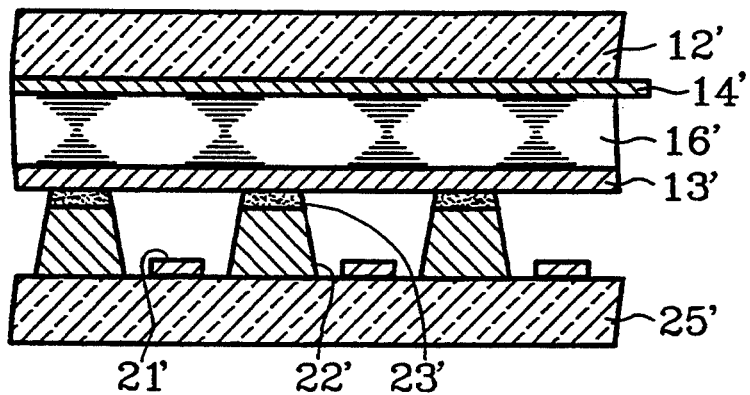
Figure 5:
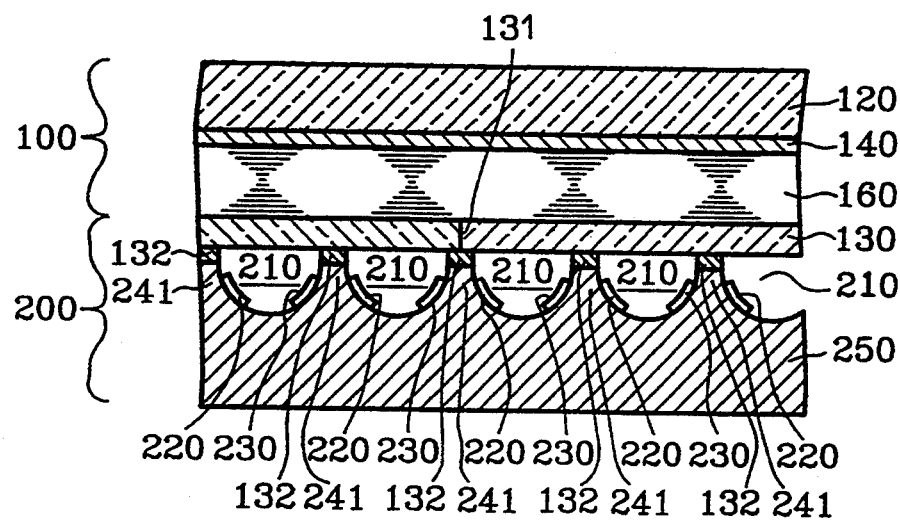
FIGS. 5 and 6 are schematic sectional views of a plasma addressed liquid crystal display according to the present invention.
Figure 6:
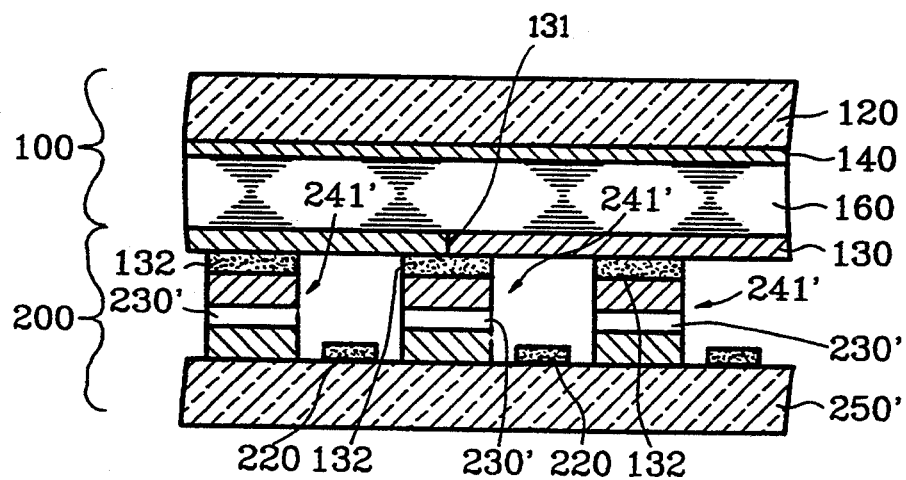
Figure 7:
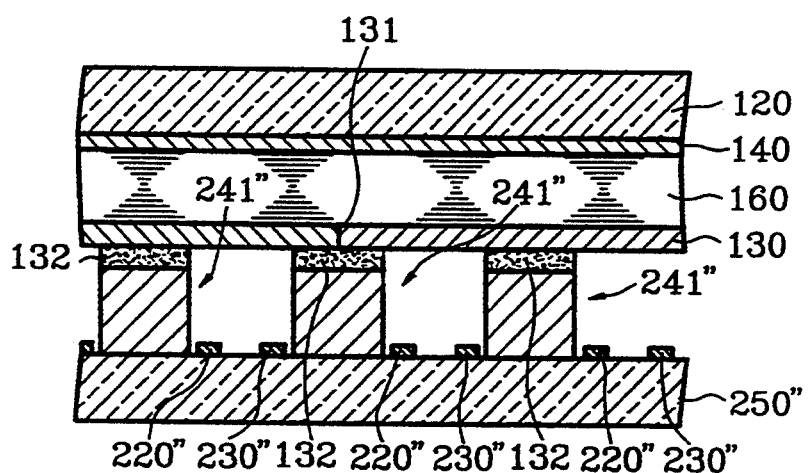
FIG. 7 is a schematic sectional view of a plasma addressed liquid crystal display according to another embodiment of the present invention.

Referring to FIGS. 5, 6 and 7, a plasma addressed LCD of the present invention is composed of a liquid crystal shutter 100 and a plasma addressing unit 200.

With reference to FIG. 5, liquid crystal shutter 100 has first and second transparent substrates 120 and 130 between which liquid crystal is filled. Striped data electrodes 140 are formed on the inner side of first substrate 120 which is the front substrate. The second substrate 130 has a thickness of about 50 $\mu$m and is preferably formed of a thin soda-lime glass. The second substrate 130 is divided into segments which are connected at joints 131. The joints 131 are positioned above the barriers 241 and are adhered to the barriers 141 with paste 132. The paste may be a solid or a gel which absorbs impacts. Considering the strength of second substrate 130, the gel state is preferable.

Plasma addressing unit 200 has a plurality of scan lines 210 in the form of grooves and a plurality of barriers 241 on a third substrate 250. The grooves 210 and the barriers 241 are positioned at right angles to the data electrodes 140. A pair of electrodes 220 and 230 are provided in parallel on either side of the bottom of each groove 210. In this configuration, third substrate 250 is adhesively fixed to second substrate 130 of liquid crystal shutter 100 so that grooves 210 form a closed discharge space in which discharge gas is filled.

Referring to FIG. 6, transparent first and third substrates 120 and 250' are positioned at a distance apart to protect a later-mentioned liquid crystal shutter 100 and plasma addressed unit 200. A plurality of striped transparent data electrodes 140 are formed in parallel on first substrate 120. A liquid crystal layer 160 and a second substrate 130 are subsequently provided in contact with the first substrate. Having a thickness of 50 $\mu$m and a predetermined dielectric constant, second substrate 130 plays a very important role in orienting the liquid crystal layer. The second substrate 130 is divided into a plurality of segments which are connected at joints 131. As in the previously described embodiment, the second substrate 130 is adhered to the barriers 241' at selected locations including the locations of joints 131. A plurality of barriers 241' having a predetermined height and a striped second electrode 230' disposed between each of their bodies are provided on the opposite side of liquid crystal layer 160. First electrodes 220 are provided parallel with second electrodes 230' between the barriers on the inner surface of third substrate 250'. In the embodiment depicted in FIG. 6, the second electrodes 230 have both flanks completely exposed to the discharge space between barriers 241'. However, each second electrode 230 may have only one side exposed. Similar to the embodiment depicted in FIG. 5, the second substrate 130 of the embodiment depicted in FIG. 6 is adhered to the barriers 241' by paste 132.

The LCD of FIG. 7 is characterized in that barriers 241" are stacked on third substrate 250". Both the first and second electrodes 220" and 230" are formed on the inner surface of third substrate 250" and placed between barriers 241". Accordingly, there are no electrodes disposed within the barriers 241" and the barriers 241" are adhered to the second substrate 130 by the paste 132.

In the above structures, barriers 241, 241' and 241", first electrodes 220, 220', 220" and second electrodes 230, 230', 230" are perpendicular to the data electrodes 140 formed on the first substrate. Barriers 241, 241', 241" each function as a spacer to provide a gas filled space between second and third substrates 130 and 250. These barriers are comprised of a paste which has a melting point over 500° C. and which includes large quantities of metal oxides such as $Al_2O_3$ or $SiO_2$. The central second substrate 130 isolates liquid crystal layer 160 from the discharge space and orients the liquid crystal by being charged during discharge due to its dielectric characteristics.

According to the present invention, the heretofore expensive second substrate may be formed with a plurality of relatively cheap substrate materials due to the improved fixing structure. Hence, the cost of the end product can be reduced and a screen of a desired size can be manufactured regardless of the size of the substrate material. In fixing the second substrate materials, their joints are coupled by paste and supported by the barriers on the third substrate. Since the joint is supported by the gel-state paste, the second substrate exhibits durability against external impacts and no minute gaps exist at the contact of the barriers. The lack of gaps at the contact of the barriers efficiently prevents crosstalk between the discharge lines. Also, since the LCD of the present invention has an improved feature in the fixing structure for the second substrate, it is not limited by peripheral structures such as the barrier structure or the electrode arrangement.

A manufacturing method for the liquid crystal display of the present invention is described below.

First, the striped transparent first and second electrodes 220 and 230 and barriers 241 are formed on the third substrate 250. In the LCD of FIG. 5, the third substrate 250 is etched by photolithography to form a plurality of parallel channel-shaped lengthwise grooves 210 and to form barriers of a predetermined height. After that, the first and second electrodes 220 and 230 are formed in parallel on the bottom of the grooves 210.

In the LCD of FIG. 6, after the first electrodes are formed on the third substrate, the barriers of a predetermined height are formed therebetween. The second electrodes are formed in the middle of or on the top of the barriers.

In the LCD of FIG. 7, after a plurality of the first and second electrodes 220' and 230' are formed on the third substrate 250, barriers 241' of a predetermined width and height are formed between respective pairs of the first and second electrodes 220' and 230'. In each of the above described embodiments, after the formation of the electrodes and barriers on the third substrate, paste is coated on the top of the barriers to a predetermined thickness and a segmented second substrate of a predetermined thickness is placed on the paste. The joints of the substrate are located on top of the barriers. To provide adhesion, the joints are slightly compressed. The resultant cohesive body is heated at a temperature below the freezing point of the paste, that is, at temperature where the paste exists as a gel or as a solid. Suitable pastes for this task include #D-4057 and #D-4058 of the ESL company which gel at around 480° C. Therefore, when the heating temperature is 480° C., the paste gels; and, when above this temperature, the paste solidifies. Since it is desirable to have the paste exist in a gel state, the paste is preferably heated at a temperature where the paste gels. The gel-state paste acts as an elastic buffer layer which is suitable for supporting the thin second substrate.

Subsequently, the first substrate where the data electrode is formed in advance is positioned at a distance apart from the top of the second substrate so that a space is provided between the first substrate and the second substrate. The space is filled with liquid crystal and sealed. This constitutes a preliminary completion of the LCD which needs subsequent ordinary finishing steps.

The present invention solves the problem of the gap between the second electrode and the barriers, and particularly the problem of cost due to the expensive second substrate. Further, since screen size is not restricted by the material of the second substrate, the present invention facilitates the manufacture of large screens.

While the invention has been particularly shown and described With reference to preferred embodiments thereof, it will be understood by those skilled in the art that various changes in form and details may be made therein without departing from the spirit and scope of the invention as defined by the appended claims.

What is claimed is:

1. A plasma addressed liquid crystal display comprising:
   a first substrate;
   a plurality of striped data electrodes disposed on an inner side of said first substrate;
   a second substrate of a predetermined thickness spaced from said first substrate to make a liquid crystal space;
   a third substrate spaced from said second substrate;
   partition barriers of a predetermined height and width positioned between said second and third substrates creating a plurality of parallel linear plasma discharge spaces and providing to said second substrate a potential for activating liquid crystal in cooperation with said data electrodes; and
   first and second electrodes for creating a linear discharge in each linear plasma discharge space,
   wherein said second substrate is composed of a plurality of substrate members which are connected to each other at selected joints, the joints overlaying and being fixed by paste on a top surface of said partition barriers.

2. A plasma addressed liquid crystal display as claimed in claim 1, wherein said paste comprises a gel having a predetermined elasticity.

3. A plasma addressed liquid crystal display as claimed in claim 3, wherein said first electrodes are formed on the bottom of said third substrate between said barriers, and wherein each of said barriers includes first and second segments, said second electrodes being sandwiched between the first and second segments of said barriers.

4. A plasma addressed liquid crystal display as claimed in claim 2, wherein said first and second electrodes are formed on the surface of said third substrate between said barriers.

5. A plasma addressed liquid crystal display as claimed in claim 1, wherein said first electrodes are formed on the bottom of said third substrate between said barriers, and wherein each of said barriers includes first and second segments, said second electrodes being sandwiched between the first and second segments of said barriers.

6. A plasma addressed liquid crystal display as claimed in claim 5, wherein said second electrodes are placed between said paste and said barriers.

7. A plasma addressed liquid crystal display as claimed in claim 5, wherein said second electrode is placed in the middle of said barriers.

8. A plasma addressed liquid crystal display as claimed in claim 1, wherein said first and second electrodes are formed on the surface of said third substrate between said barriers.

9. A plasma addressed liquid crystal display as claimed in claim 8, wherein said barriers are integrally formed with said third substrate.

10. A plasma addressed liquid crystal display as claimed in claim 8, wherein said barriers are formed of frit glass and stacked on said third substrate by a screen printing method.

* * * * *

UNITED STATES PATENT AND TRADEMARK OFFICE
CERTIFICATE OF CORRECTION

PATENT NO. : 5,383,040
DATED : January 17, 1995
INVENTOR(S) : Dae-Il Kim

It is certified that error appears in the above-indentified patent and that said Letters Patent is hereby corrected as shown below:

Column 6, line 44, change "2," to --1--.

Signed and Sealed this

Twenty-seventh Day of June, 1995

Attest:

BRUCE LEHMAN

Attesting Officer     Commissioner of Patents and Trademarks